(12) United States Patent
Srinivas et al.

(10) Patent No.: US 9,004,736 B1
(45) Date of Patent: Apr. 14, 2015

(54) LIGHT GUIDES HAVING REFLECTIVE COATINGS

(71) Applicant: Amazon Technologies, Inc., Reno, NV (US)

(72) Inventors: Vikram Srinivas, San Jose, CA (US); Anoop Menon, Capitola, CA (US); Ali-Reza Bahmandar, San Jose, CA (US); Ramez Nachman, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 101 days.

(21) Appl. No.: 13/892,426

(22) Filed: May 13, 2013

(51) Int. Cl.
*F21V 7/04* (2006.01)
*F21V 8/00* (2006.01)

(52) U.S. Cl.
CPC .................................. *G02B 6/0073* (2013.01)

(58) Field of Classification Search
CPC ............ F21V 7/00; F21V 7/22; F21V 7/0083
USPC ........................................ 362/97.1, 97.2, 612
See application file for complete search history.

(56) References Cited

U.S. PATENT DOCUMENTS

| 6,491,412 | B1 * | 12/2002 | Bowman et al. ............... 362/241 |
| 2008/0239750 | A1 * | 10/2008 | Chang ............................ 362/609 |
| 2009/0097246 | A1 * | 4/2009 | Tsao et al. ..................... 362/240 |
| 2011/0002141 | A1 * | 1/2011 | Chang ............................ 362/606 |
| 2014/0071713 | A1 * | 3/2014 | Liao ............................... 362/627 |
| 2014/0146531 | A1 * | 5/2014 | Ng et al. ......................... 362/231 |

* cited by examiner

*Primary Examiner* — Ali Alavi
(74) *Attorney, Agent, or Firm* — Sutherland Asbill & Brennan LLP

(57) ABSTRACT

Assemblies and techniques are provided for light guides integrated into display devices having front light sources. In one aspect, a light guide can include one or more reflective coatings that are applied or otherwise integrated onto one or more internal surfaces of the light guide. Application of at least one reflective coating can modify the luminance and/or chromaticity of the light guide. The one or more coatings can comprise one or more applied layers of paint, such as a layer of a glossy colored paint and/or a layer of a chrome paints.

21 Claims, 19 Drawing Sheets

LIGHT GUIDES HAVING REFLECTIVE COATINGS

BACKGROUND

In general, in a conventional display device with front light sources (also referred to as front-lit display), a light guide can be integrated into such a device and optically coupled to one or more of the front light sources. Light emitted by the one or more front light sources can be injected into the light guide via one or more optical modes of the light guide, and such injected light may be referred to as in-coupled light. In addition, in-coupled light can be scattered off by a grating pattern or other scattering patterns, such as scattering centers, that can be integrated into the front-lit display; such scattered off light can be referred to as out-coupled light. Yet, a significant portion of light in-coupled into the light guide may not emanate as out-coupled light through such grating patterns or scattering centers. Light that is not out-coupled by the grating patterns or scattering centers may escape the free edges of the light guide and reduce efficiency in the optical design of the display.

In addition, typical front-lit displays may present significant color non-uniformity that may be readily perceivable to the human eye. Several likely mechanisms may contribute to such color non-uniformity, including light scattering, light absorption, light refraction, light interference, and/or light diffraction. With respect to light absorption, in a typical front-lit display, the progressive absorption of a certain wavelengths along the length of the display device can contribute to color non-uniformity, as such absorption may lead to progressive spectral shaping of a resulting optical emission spectra that it is perceived as color by an end-user of the display device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings form part of the disclosure and are incorporated into the subject specification. The drawings illustrate example embodiments of the disclosure and, in conjunction with the present description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

The disclosure recognizes and addresses, in at least certain aspects, the issue of color non-uniformity and luminance non-uniformity in front-lit display devices. As described in greater detailed below, the disclosure provides light guide assemblies (also referred to as light guides) that can be integrated into display devices having front light sources and can improve color and/or luminance uniformity in display devices (or displays) having front light sources with respect to typical light guide. The disclosure also provides techniques for the generation of such light guides. In at least certain aspects, a disclosed light guide can incorporate one or more reflective coatings that can be applied or otherwise integrated onto one or more internal surfaces of the light guide. In other aspect, other light guides can form or comprise a solid, open enclosure having substantially transparent facets or members, and the one or more reflective coatings can be applied to at least one external facet (e.g., an external edge surface) of such other light guides. The coating(s) can be reflective and can comprise one or more applied layers of a solid material, such as one or more layers of a glossy colored paint and/or one or more layers of a chrome paint. In addition, the coating(s) can comprise solid thin-films formed from one or more solid plastics, such as polymers. Application of the coating(s) can permit adjustment of luminance and/or chromaticity of front-lit display devices. Selection of coatings can be based on desired or otherwise intended modification of the luminance and/or color characteristics of a display device. While for the sake of illustration, the disclosure refers to a set of one or more light emitting diodes as sources of light in a front-lit display, the disclosure is not so limited and substantially any sources of light can be contemplated.

Examples of the disclosure may provide various advantages over conventional displays having front light sources. As an illustrative advantage, incorporation of reflective coatings onto internal surfaces of a light guide integrated into a front-lit display can increase luminance uniformity and/or color uniformity with respect to front-lit displays that lack a reflective coatings as disclosed. Improved luminance uniformity can yield improved batter life in a portable device (e.g., an electronic book reader (an e-reader), a tablet computer, or a mobile phone). It should be appreciated that incorporation of reflective coatings onto one or more internal surfaces of a light guide integrated into a front-lit display can be achieved without modification of a specific optical design (e.g., grating design, structure of the display's light guide, structure of optical couplings among light source(s) and the light guide, or the like). Instead, integration of such coatings can be attained through modification of an assembly or manufacturing process of the front-lit display.

Figure 1A:
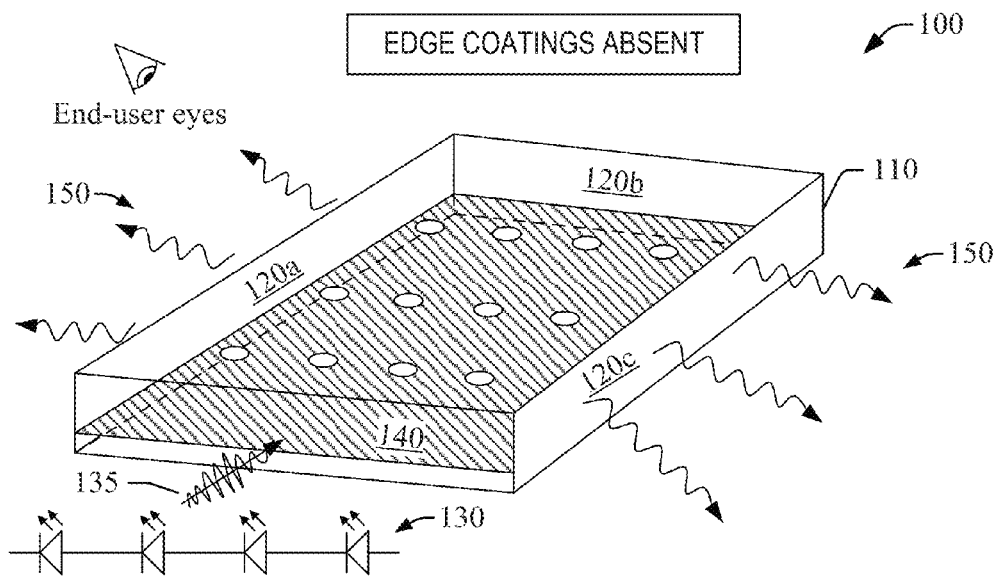
FIGS. 1A-1B illustrate example light guide assemblies in accordance with one or more aspects of the disclosure.
Figure 1B:
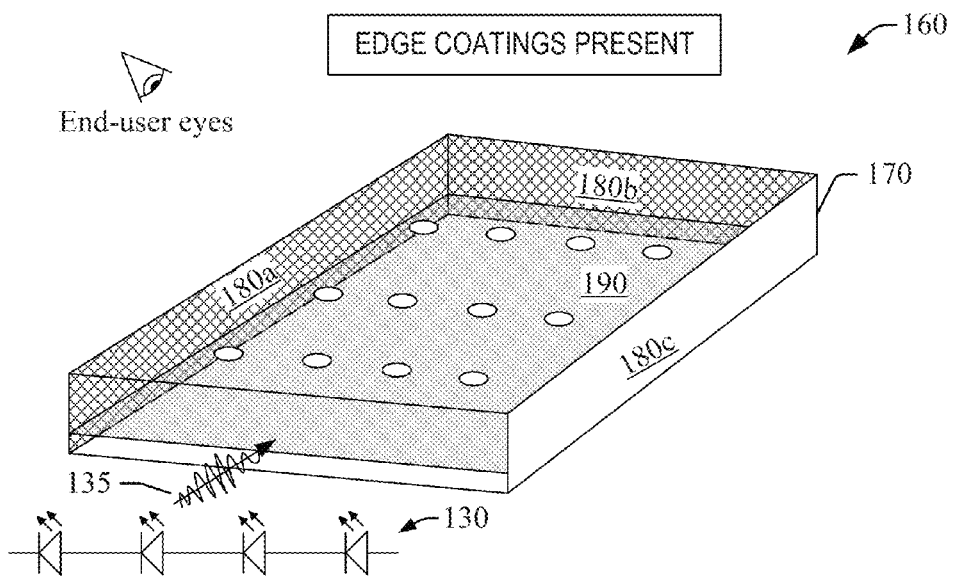

In connection with the drawings, FIGS. 1A-1B illustrate example light guides in accordance with one or more aspects of the disclosure. As illustrated in FIG. 1A, an example light guide 100 can include an enclosure 110 that can be defined by a housing of an electronic assembly (e.g., electronic circuitry or components of a computing device). The enclosure 110 can be formed by a plurality of surfaces, referred to as edge surfaces. For example, the plurality of surfaces can include three edge surfaces 120a-120c, each of the three edge surfaces having an internal surface. In other embodiments, the edge surface may be a least partially continuous about the display, such as where the display may have a curved or non-linear edge. The example light guide 100 can be coupled (e.g., optically, mechanically, or optically and mechanically) to a set of one or more light emitting diodes 130 that can be contained within the housing that defines the enclosure 110. In one aspect, each of the set of one or more light emitting diodes 130 can be positioned at a proximal end of the housing and can inject light 135 into the enclosure 110. In addition, the example light guide 100 can be coupled to a grating layer 140 (or grating 140) having, in one example embodiment, a grating pattern comprising scattering centers (represented with open circles). Each of the scattering centers in the grating 140 can permit scattering or transmitting light to the eyes of an end-user through a substantially transparent surface that can be coupled to the housing that defines the enclosure 110. In certain embodiments, the grating 140 can comprise a plurality of micro-lenses that embody or constitute, at least in part, the scattering centers in the grating 140. It should be appreciated that micro-lenses can embody scattering centers in grating layers formed via lacquer embossing.

Figure 2:
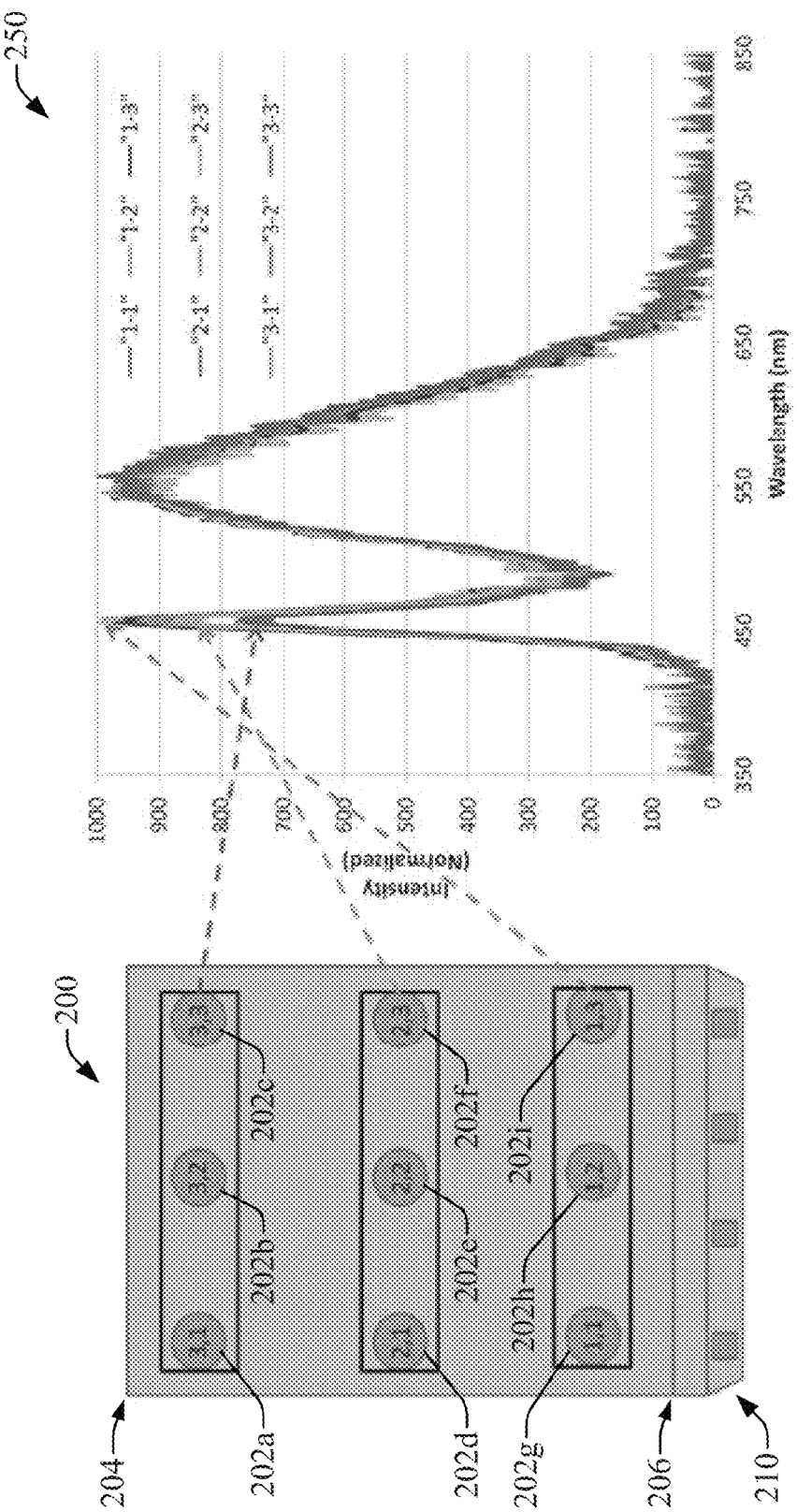
FIG. 2 illustrates example emission spectra of a conventional front-lit display having a non-coated light guide.

In one aspect, the light 135 that is injected into the light guide 100 and is not out-coupled via the scattering centers in the grating 140 can escape as stray light 150 through one or more of the plurality of edge surfaces 120a-120c. In addition, at least a portion of the injected light 135 can be absorbed along the length of the light guide 100 (e.g., along the direction from the light injection point near the set of one or more light emitting diodes 130 to the edge surface 120b. Such absorption can be affect the spectral composition of the light that is emitted out-coupled from the light guide 100. As an example, FIG. 2 illustrates optical emission spectra of light collected at various positions above an example light guide 200 optically coupled to a set of front light sources 210 (represented with a group of four squares). The example light guide 200 is similar to the example light guide 100 of FIG. 1A. As illustrated in the plan view of the light guide 200, the positions can be arranged in an array of nine locations 202a-202i along the length of the light guide 200, from a proximal edge located near the light sources 210 (e.g., a plurality of light emitting diodes (LEDs)) to the distal edge 204 of the light guide 200; as illustrated, the light guide 200 also has a proximal end 206. Each of the nine locations is represented with a circle labeled with a composite index (n,m), where n designates a row position and m designates a column position, and n, m=1, 2, 3, and a respective optical emission spectrum also is labeled with a respective composite index. Accordingly, in one aspect, greater values of the index n represent greater distances from the source of lights 210 (or closer proximity to the distal edge of the light guide 200).

Each of the optical emission spectra illustrated in FIG. 2 corresponds to each composite index and presents two maxima: a narrow maximum at about 460 nm and a broader maximum at about 560 nm. The spectral composition, e.g., the intensity of emitted light at a specific wavelength, is space dependent. In particular, the relative intensity of the narrow maximum with respect to the broader maximum decreases as the distance from the light sources 210 increases. As described herein, the spatial decrement of the narrow maximum can originate from at least progressive absorption of wavelengths about the 460 nm along the length of the light guide 200. Such a relative intensity can define the emitted light's color that is perceived by the human eye (e.g., the eyes of an end-user of an electronic device having a display device comprising the light guide 200 and the sources of light 210). Accordingly, in one aspect, the perceived color of the emitted light can be non-uniform across the light guide. As described herein, other factors, such as scattering, refraction, interference, and/or diffraction also can yield a perceived color non-uniformity of the light emitted from the example light guide 200.

In one aspect of the disclosure, one or more of the plurality of edge surfaces 120a-120c of the light guide 100 of FIG. 1A can be treated to reduce the amount of stray light 140. In certain embodiments, each of the plurality of edge surfaces can be treated. Treatment of an edge surface can comprise one or more of painting the edge surface, applying or coating the edge surface with a layer of a solid material, depositing (for example, via sputtering or vapor deposition) one or more material onto the edge surface, a combination thereof, or the like. As illustrated in FIG. 1B, a light guide 160 having a plurality of treated edge surfaces can be assembled or otherwise formed. In one aspect, the light guide 160 has a plurality of three treated edge surfaces 180a-180c, though a light guide of a different configuration may have fewer or more treated edges, and fewer than all the edges may be treated with a reflective coating. In one embodiment, the treatment can comprise application or otherwise incorporation of a coating (illustrated with cross-hatching) to each of the internal surfaces of the edge surfaces 180a-180c. The coating (e.g., a deposited or applied layer of a material, such as paint or a solid thin-film) can be configured to reflect light that is not out-coupled via a grating layer 190. For instance, the coating can have a finite reflectance coefficient at wavelengths in the emission spectrum of at least one or more of the set of one or more LEDs 130. In certain embodiments, the coating can be embodied in or can comprise a layer of glossy colored paint (e.g., satin wildflower or an oil-based paint, such as gloss spa blue) and/or a layer of chrome paint. In other embodiments, the coating can comprise a layer of a plastic or a doped semiconductor material.

As described herein, each of the coatings applied or otherwise incorporated into one or more of the edge surfaces 180a-180b can reflect light that is injected into the light guide 160, but that it is not out-coupled via the a grating layer 190 coupled to the light guide 160. The grating layer 190 can have substantially the same structure and functionality as the grating layer 140. Accordingly, in one aspect, each of the coatings (e.g., the layer of paint) can be selected based at least in part on one or more respective optical properties (e.g., reflectance and/or color) of each of the coatings. Based on such selection, the coatings can mitigate the absorption that may be present along the length of the light guide 160 (e.g., along the direction from the light injection point towards the distal edge surface 180*b*). As described herein, the application or incorporation of the coatings onto one or more of the internal surfaces of the plurality of the edge surfaces 180*a*-180*c* of the example light guide 160 can increase color uniformity and/or luminance uniformity with respect to such properties in the example light guide 100.

Figure 3:
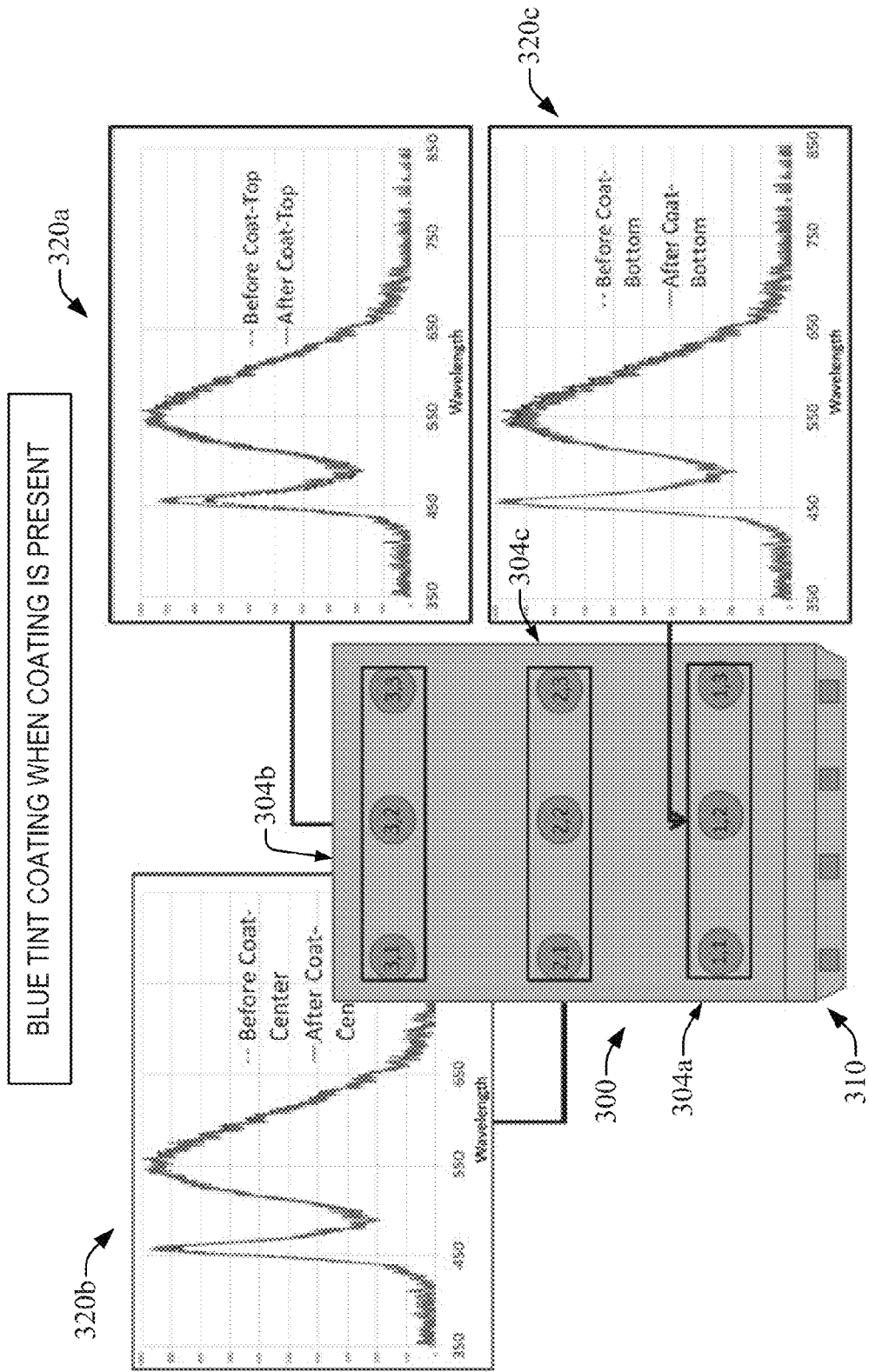
FIG. 3 illustrates example emission spectra of front-lit display devices in accordance with one or more aspects of the disclosure.

FIG. 3 illustrates example optical emission spectra of front-lit display devices comprising respective light guides in accordance with one or more aspects of the disclosure. As illustrated, a light guide 300 is optically coupled to a set of front light sources 310 (e.g., a plurality of LEDs). Similar to the data presented in FIG. 2, the optical emission spectra in FIG. 3 is obtained at several positions (represented with composite indices (n,m), with n,m=1, 2, 3) above a surface substantially normal to the edges surfaces of the light guide 300. The optical emission spectra presented in charts 320*a*-320*c* have qualitatively similar features: a narrow maximum at about 460 nm and a broader maximum at about 560 nm. In one embodiment, the light guide 300 does not incorporate a coating onto any of the light guide's edge surfaces. In such an embodiment, similar to the data shown in FIG. 2, the relative intensity of the narrow maxima with respect to broad maximum progressively decreases as the distance of the location at which the optical emission spectrum is probed with respect to the front light sources increases.

In contrast, in an embodiment in which the light guide 300 includes a blue tint coating (e.g., an applied layer of an oil-based blue paint, such as gloss spa blue paint) on each of the edge surfaces 304*a*-304*c* of the light guide 300, the optical emission spectra present lesser spectral changes as a function of position when compared to the optical emission spectra obtained for a light guide lacking coated edges. In particular, yet not exclusively, the optical emission spectra obtained from a light guide 300 having coated edges present a relative magnitude of the narrow maximum with respect to the broad maximum that decreases less markedly as the location at which the optical emission spectrum is probed becomes more distant from the front light sources 310. Accordingly, in one aspect, incorporation of the blue tint coating can yield increased uniformity for the perceived color of out-coupled light emitted from the light guide 300.

Figure 4A:
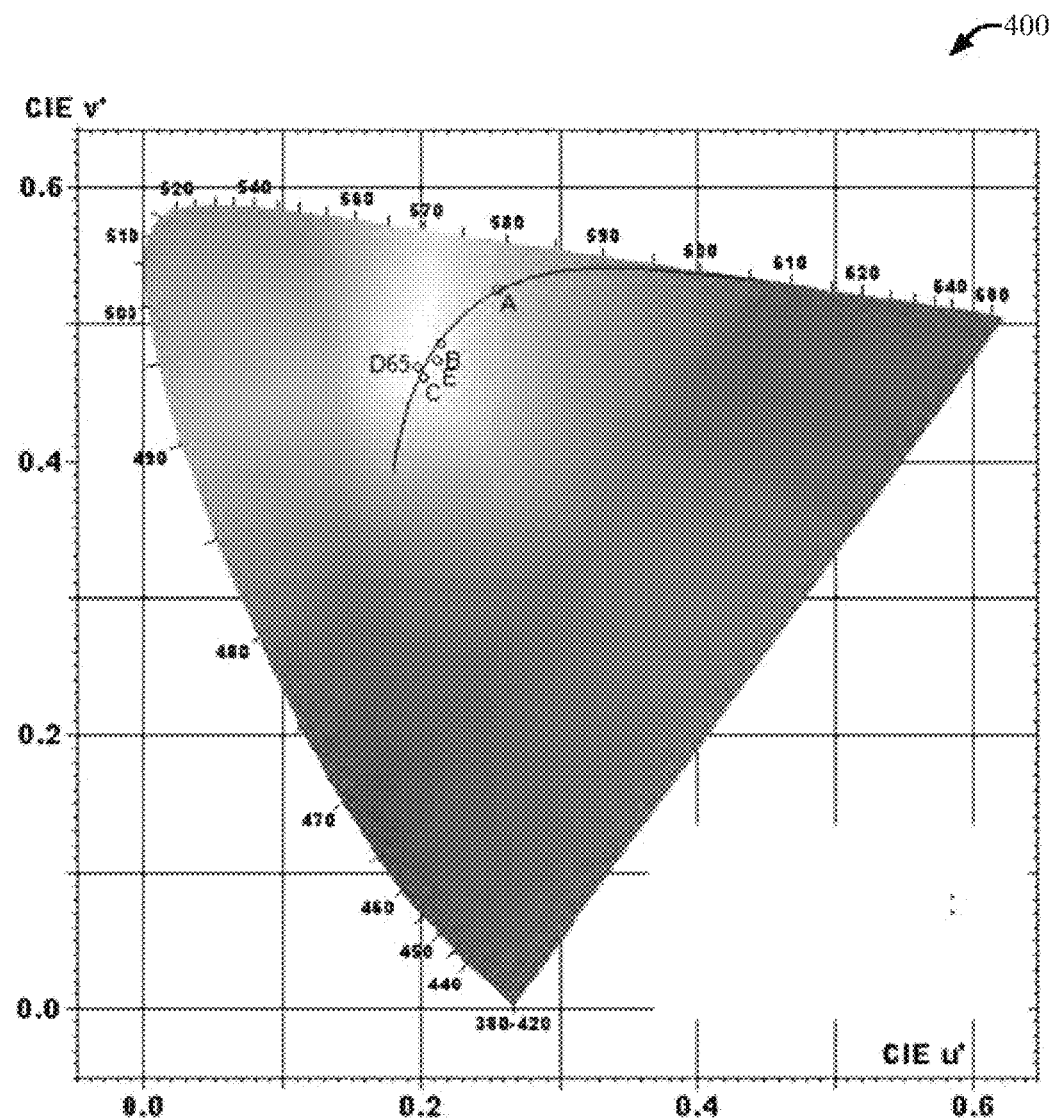
FIGS. 4A-4B illustrate example diagrams of chromaticity maps in accordance with one or more aspects of the disclosure.

Relative color uniformity of light emitted from a light guide 300 having coated edges (referred to as "coated light guide") with respect to a light guide 300 without coated edges (referred to as "non-coated light guide") can be determined based at least in part on measured optical emission spectra and related chromaticity analysis. Such analysis can be based or otherwise rely on at least the standardized CIE 1976 color space and related CIE uniform chromaticity scale (UCS) diagram, which is shown at diagram 400 in FIG. 4A. Also shown in diagram 400 is the Planckian locus (presented as a solid line) and (u',v') chromaticity coordinates (or color coordinates) of standard illuminants A, B, E, C, and D65 (such coordinates are illustrated with circles). Here, u' and v also are referred to as CIE u' and CIE v'. It should be recognized that the type of chromaticity analysis described herein can be based on other standardized CIE color spaces, such as the CIE 1931 XYZ color space, CIE 1964 (U,V,W) color space, or the like. In order to determine such relative color uniformity, in one aspect, the standard power distribution of the light guide 300 without coated edges can be determined from at least the data illustrated in FIG. 3 and suitably combined with the color matching functions $\bar{x}(\lambda)$, $\bar{y}(\lambda)$, and $\bar{z}(\lambda)$ defined by CIE in order to generate tristimulus values X, Y, and Z and derive coordinates $$u' = \frac{4X}{X + 15Y + 3Z} \text{ and } v' = \frac{9Y}{X + 15Y + 3Z}.$$

Figure 4B:
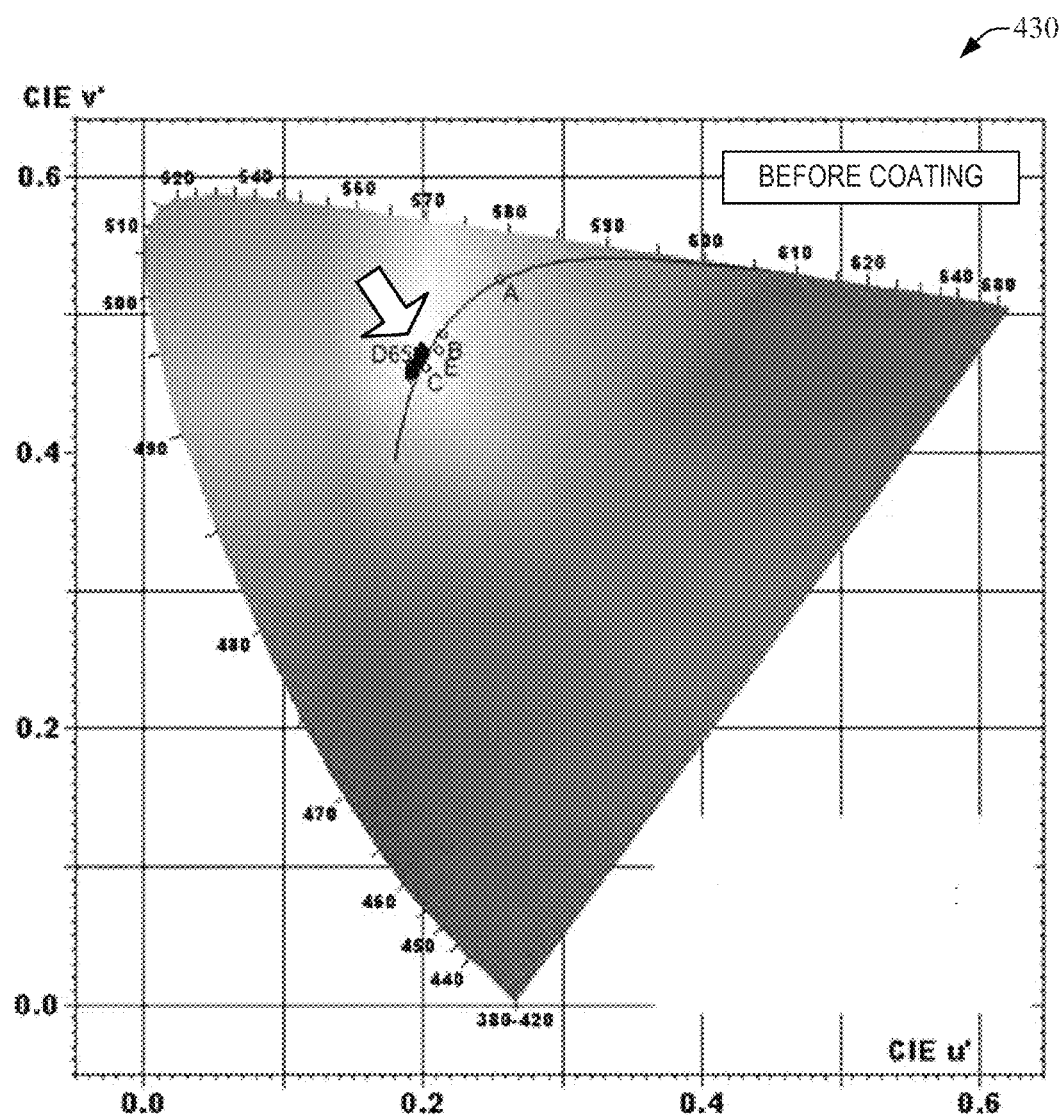
Figure 4C:
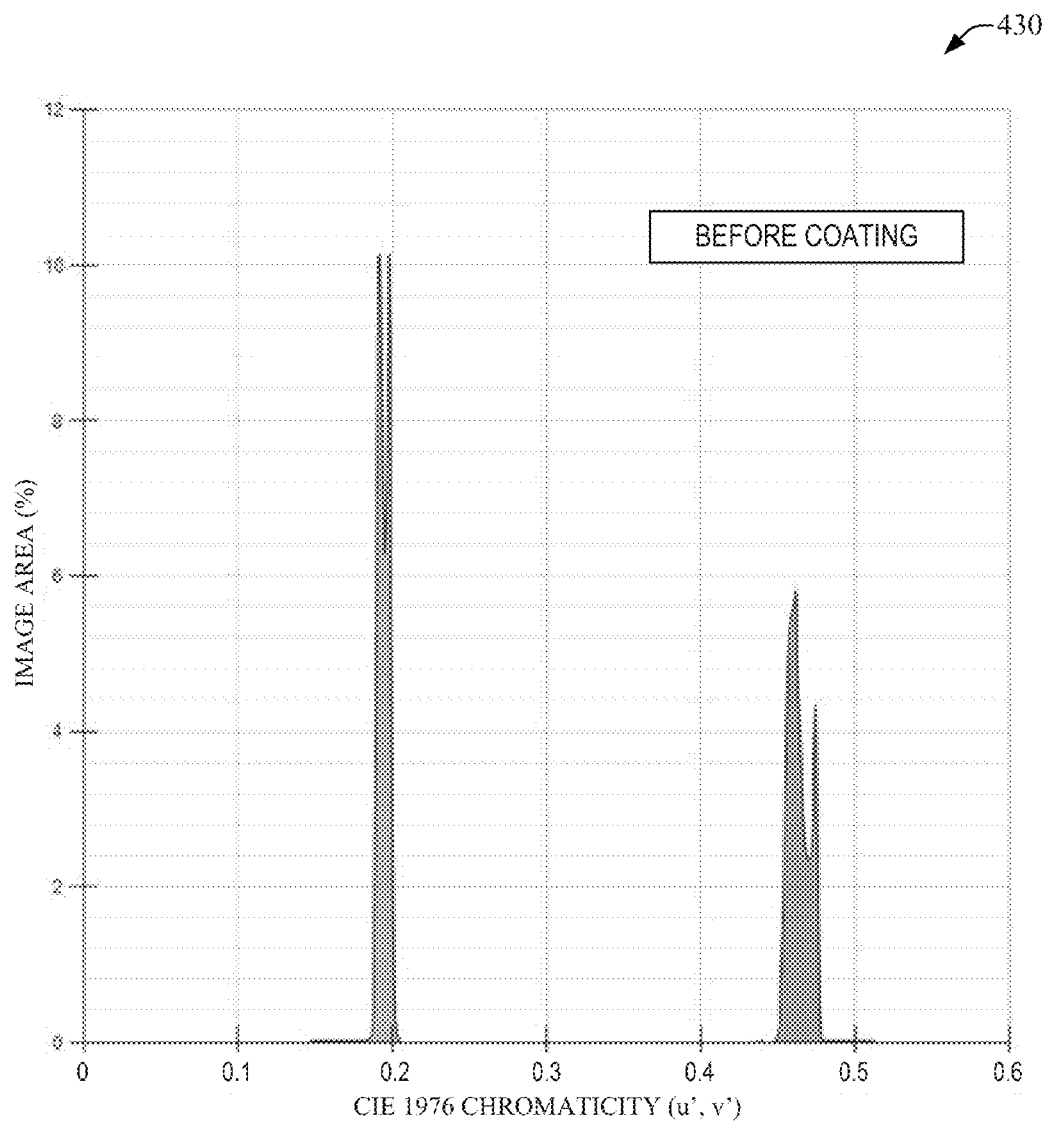
FIG. 4C illustrates an example chart of color coordinate distributions in accordance with one or more aspects of the disclosure.

Here, λ represents wavelength of electromagnetic radiation, such as light emitted from a light guide of the disclosure. In one aspect, values of (u',v') chromaticity coordinates so obtained for the light guide 300 without coated edge(s) can be represented within the CIE UCS diagram, as shown in diagram 460 in FIG. 4B. In diagram 460, values of (u',v') span a portion of the CIE UCS diagram. Such a portion is represented with densely distributed black dots and emphasized, for clarity, with an open arrow. As gleaned from the diagram 460, values of u' range from about 0.17 to about 0.21, whereas values of v' range from about 0.45 to about 0.48. In addition, the analysis can include generation or otherwise determination of the distribution of color coordinates from the chromaticity information obtained for the light guide 300 without coated edge(s) in accordance with aspects described herein. FIG. 4C presents a chart 460 that conveys the distribution of values of color coordinates u' and v'. As described herein, the values of color coordinate u' range from about 0.17 to about 0.21, whereas values of color coordinate v' range from about 0.45 to about 0.48. In addition, it can be readily gleaned from the chart 460 that the respective distributions of values of color coordinates u' and v' are substantially bi-modal distributions. Without intending to be bound by theory, modeling, or analysis, it is understood that such bi-modal distributions reveal color non-uniformity of the light guide 300 without coated edge(s).

Figure 5A:
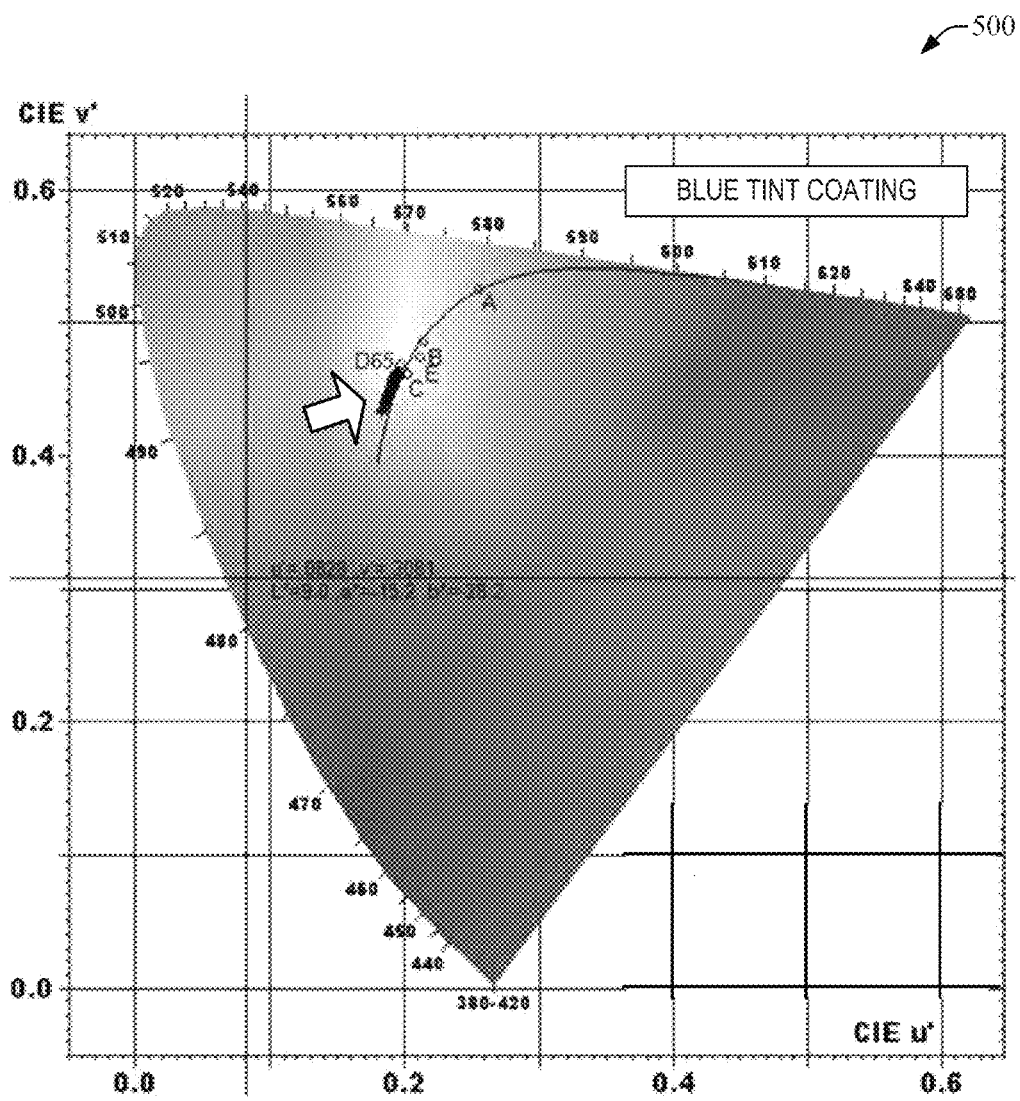
FIG. 5A illustrates an example diagram of a chromaticity map in accordance with one or more aspects of the disclosure.
Figure 5B:
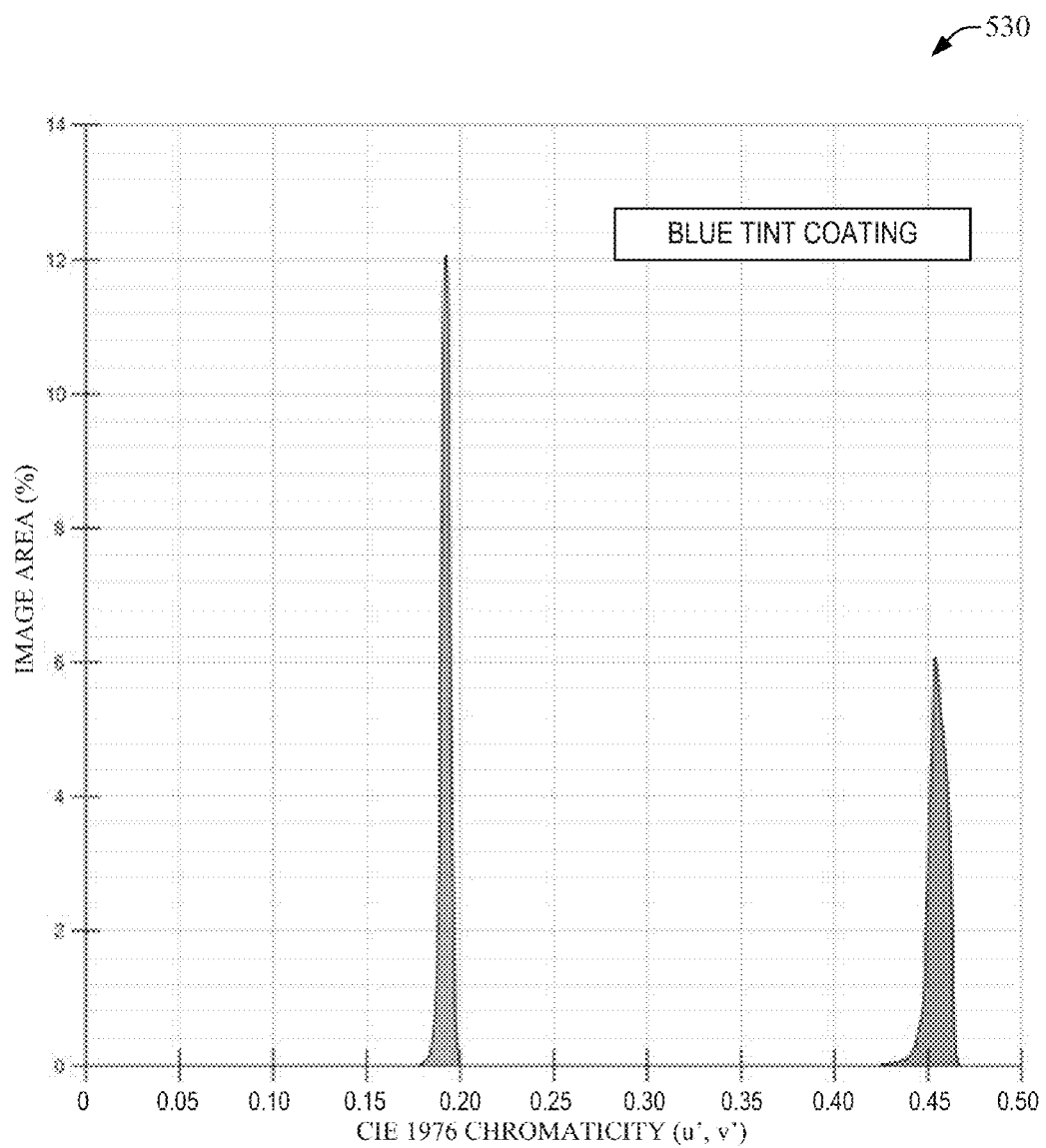
FIG. 5B illustrates an example chart of color coordinate distributions in accordance with one or more aspects of the disclosure.

Further, the chromaticity analysis described herein can be implemented for the light guide 300 having coated edge(s) in order to establish the relative chromaticity of illustrative light guides having and lacking coated edge(s). FIG. 5A presents a diagram 500 that conveys values of (u',v') chromaticity coordinates for the light guide 300 having edge surface(s) coated with a blue tint paint. The color coordinates having values (u',v')=(0.0828,0.3081) for the blue tint paint are indicated in the diagram 500. As a reference, the color coordinates for the blue tint coating in the CIE 1976 (L*, a*, b*) color space also are presented: (L*,a*,b*)=(9.0, −15.2, −28.2). As described herein, it should be appreciated that the disclosure is not so limited and other coating(s) having other color(s) can be utilized. The values are represented within the CIE UCS diagram (see, e.g., FIG. 4A). In the diagram 500, values of (u',v') span a portion of the CIE UCS diagram, wherein the portion is represented with densely distributed black dots and emphasized, for clarity, with an open arrow. As gleaned from the diagram 500, values of u' range from about 0.17 to about 0.20, whereas values of v' range from about 0.42 to about 0.48. As described herein, the analysis also can include generation or otherwise determination of the distribution of color coordinates from the chromaticity information obtained for the light guide 300 having coated edge(s) in accordance with aspects described herein. FIG. 5B presents a chart 530 that conveys the distribution of values of color coordinates u' and v' presented in the diagram 500. As described herein, the values of color coordinate u' range from about 0.17 to about 0.2, whereas values of color coordinate v' range from about 0.42 to about 0.48. In addition, it can be readily appreciated from the chart 530 that the respective distributions of values of color coordinates u' and v' are substantially single-mode distributions. Such a finding is in contrast to the bi-modal characteristic of the distribution of values of u' and v' for the light emitted from the light guide 300 without coated edge(s) (see, e.g., FIG. 4C). Without intending to be bound by theory, modeling, and/or analysis, it is understood that such single-mode distributions reveal color uniformity of the light emanated from the light guide 300 having coated edge(s). In certain embodiments, for certain light guides, it can be determined that for a blue tint coating applied or otherwise incorporated into each of the internal surfaces of the edge surfaces of such light guides 300, a color shift indicative (e.g., Delta E) of the light guide's color uniformity can decrease from 0.0214 in a non-coated light guide to about 0.0141.

The relative luminance uniformity of light emitted from a light guide 300 having coated edges with respect to a light guide 300 without coated edges can be determined from measured position-dependent optical emission spectra for such types of light guides. For example, in the embodiment in which the edge surfaces of a light guide 300 are coated with a layer of glossy blue paint (e.g., blue tint) and the optical emission spectra corresponds to at least those presented in charts 320a-320c, such a relative luminance uniformity can increase by about 11% for certain grating design of the light guide 300.

Figure 6:
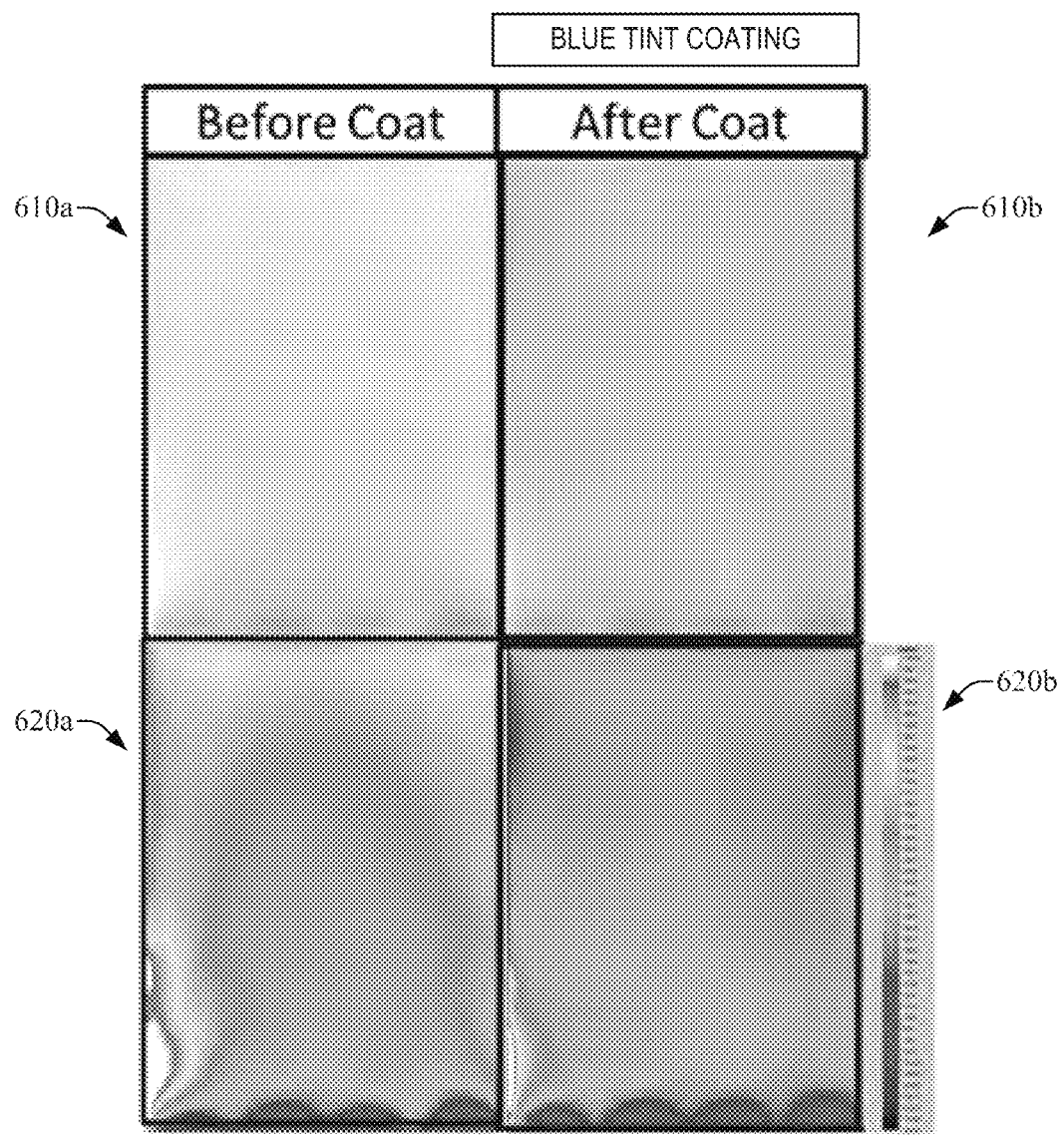
FIG. 6 illustrates example luminance maps in front-lit displays in accordance with one or more aspects of the disclosure.

FIG. 6 illustrates example luminance maps in example front-lit displays in accordance with one or more aspects of the disclosure. As illustrated in diagrams 610a and 610b, and as described herein, the luminance uniformity in a front-lit display device having an example coated light guide having, in the illustrated embodiment, a blue tint coating (e.g., an applied layer of glossy blue paint; see diagram 610b) is greater than the luminance uniformity in a corresponding front-lit display having a non-coated light guide (see diagram 610a). Diagrams 620a and 620b further reveal, in one aspect, the increased relative luminance achieved at least in part via the coating of edge surfaces of the light guide having coated edges. As described herein, the luminance uniformity in the front-lit display device having the example coated light guide having the blue tint coating (see, e.g., diagram 620b) is greater than the luminance uniformity in the corresponding front-lit display having the non-coated light guide (see, e.g., diagram 610b).

Figure 7:
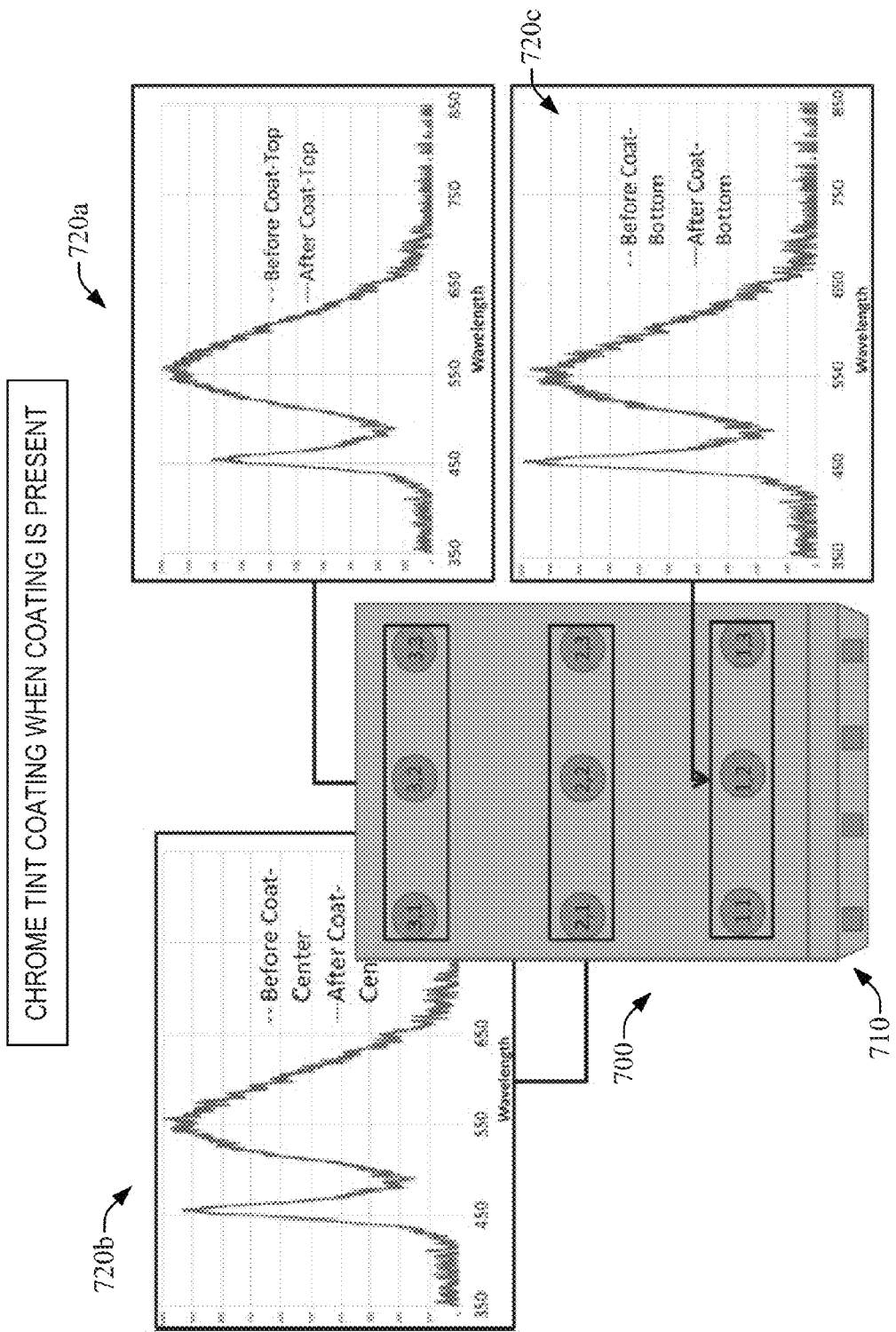
FIG. 7 illustrates other example emission spectra of example front-lit display devices in accordance with one or more aspects of the disclosure.

As another illustration, FIG. 7 presents example optical emission spectra of front-lit display devices comprising respective light guides in accordance with one or more aspects of the disclosure. As illustrated, a light guide 700 is optically coupled to a set of front light sources 610 (e.g., a plurality of LEDs). Similar to the data presented in FIGS. 2-3, the optical emission spectra in FIG. 7 can obtained at several positions represented by a composite index (l,k), wherein l designates a row position and k designates a column position, with l,k=1, 2, 3, above a surface substantially normal to the edge surfaces of the light guide 700. Similar to other data disclosed herein, the optical emission spectra presented in charts 720a-720c have qualitatively similar features: a narrow maximum at about 460 nm and a broader maximum at about 560 nm. In one embodiment, the light guide 300 can be a non-coated light guide and, in one aspect, the relative intensity of the narrow maxima with respect to broad maximum progressively decreases as the distance of the location at which the optical emission spectrum is probed with respect to the front light sources increases. In another embodiment in which the light guide 300 is a coated light guide having a chrome tint coating (e.g., an applied layer of a chrome paint) in each of the internal edge surfaces of the light guide 300, the optical emission spectra present similar spectral changes as a function of position. In particular, the data shown conveys a similar relative intensity of the narrow maximum with respect to the broader maximum in both the coated light guide and the non-coated light guide. Accordingly, in one aspect, incorporation of the chrome tint coating does not yield a perceivable change in color uniformity with respect to a non-coated light guide.

Figure 8A:
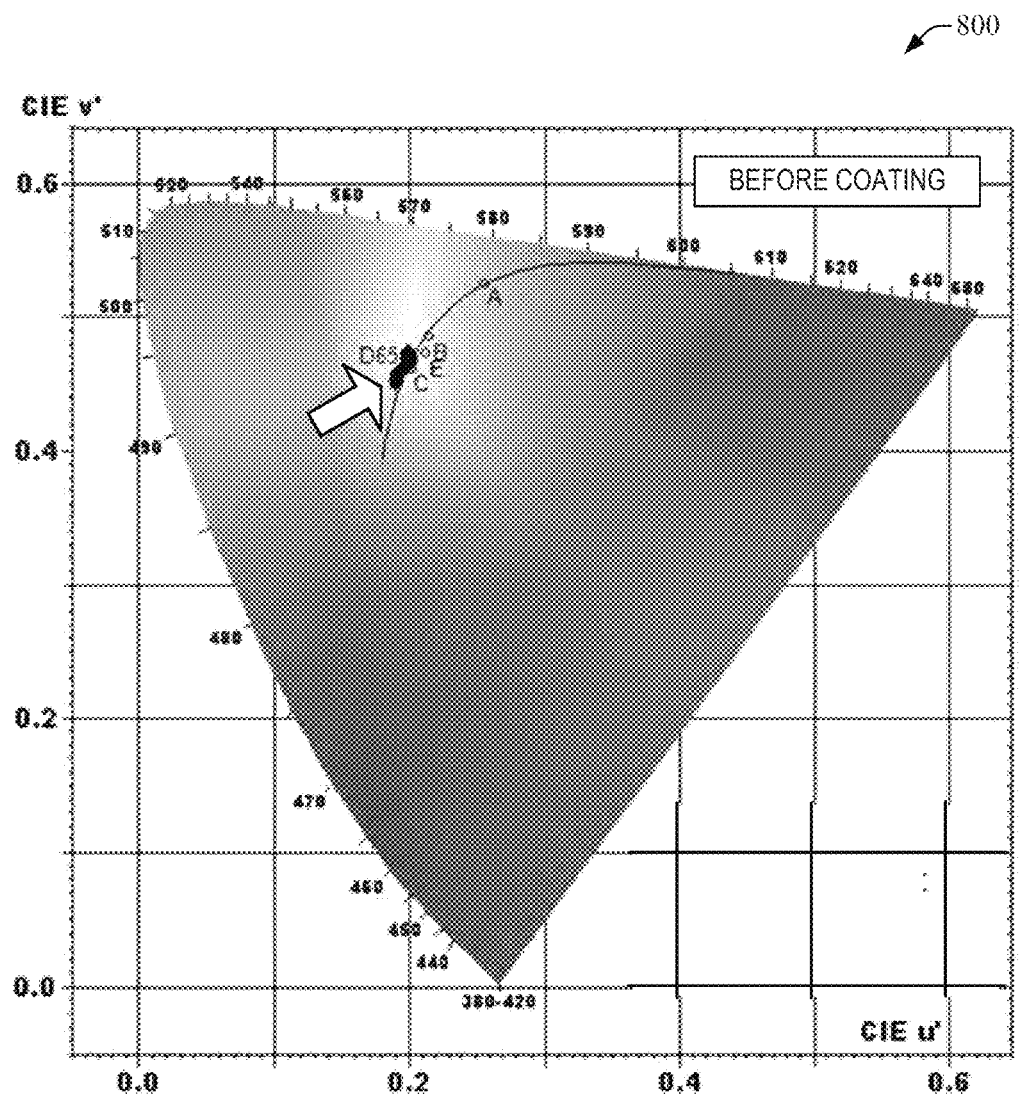
FIG. 8A illustrates an example diagram of a chromaticity map in accordance with one or more aspects of the disclosure.
Figure 8B:
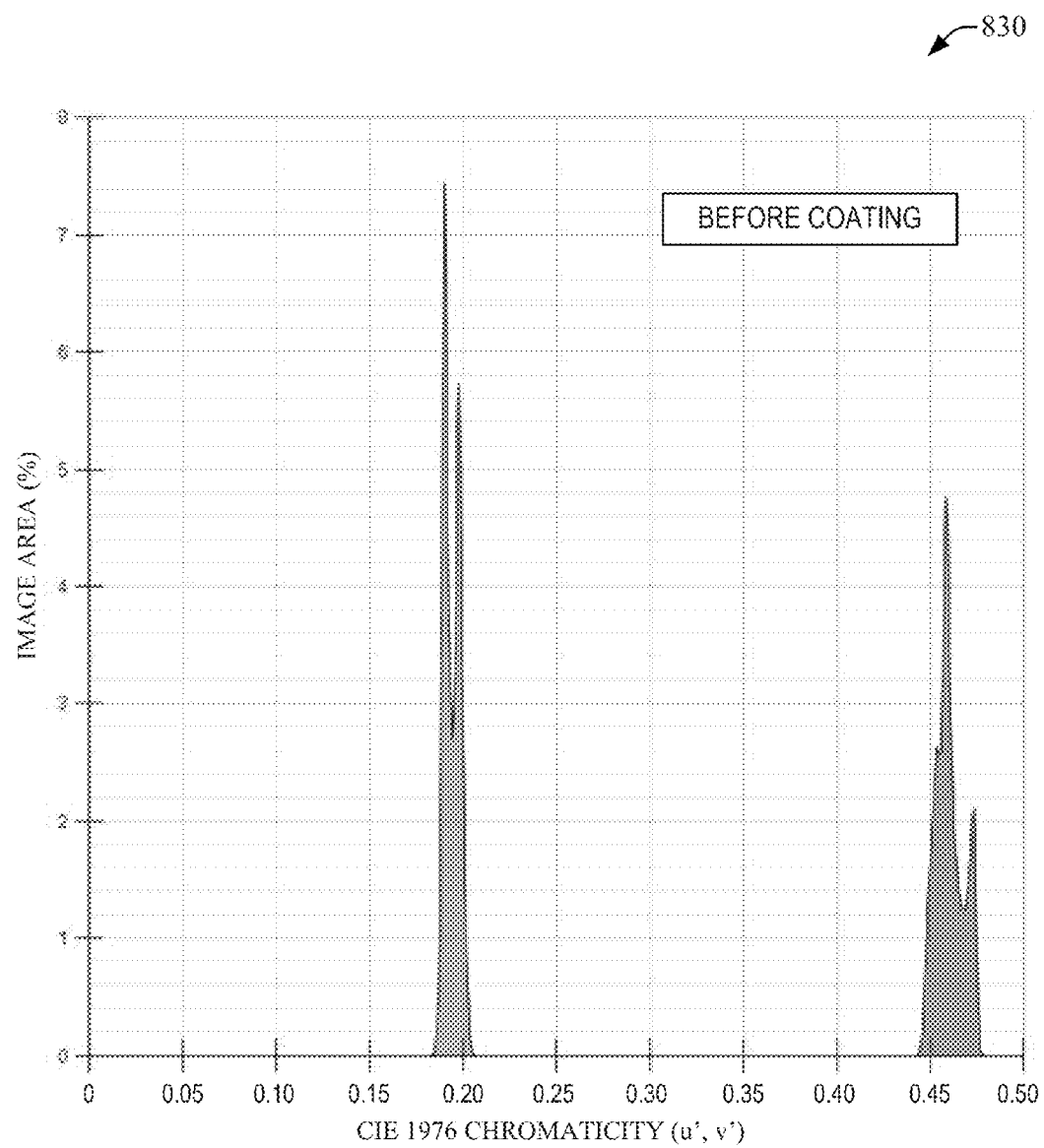
FIG. 8B illustrates an example chart of color coordinate distributions in accordance with one or more aspects of the disclosure.

The chromaticity analysis described herein can be performed based at least on emission spectroscopy data for any light guide and associated display device. FIG. 8A illustrates a diagram 800 of example values of (u',v') chromaticity coordinates for an example light guide without coated edge(s) (e.g., light guide 100). In diagram 800, the values of (u',v) span a portion of the CIE UCS diagram. Such a portion is represented with densely distributed black dots and emphasized, for clarity, with an open arrow. As gleaned from the diagram 800, values of u' range from about 0.17 to about 0.21, whereas values of v' range from about 0.44 to about 0.46. As described herein, the chromaticity analysis also can include generation or otherwise determination of the distribution of color coordinates from the chromaticity information obtained for the light guide without coated edge(s) in accordance with aspects described herein. FIG. 8B presents a chart 830 that conveys the distribution of values of color coordinates u' and v' for the light guide having that yields the chromaticity data shown in diagram 800. As described herein, the values of color coordinate u' range from about 0.17 to about 0.21, whereas the values of color coordinate v' range from about 0.44 to about 0.46. It can be readily gleaned from the chart 830 that the respective distributions of values of color coordinates u' and v' are substantially bi-modal distributions. Similar to discussion of other information herein, without intending to be bound by theory, modeling, or analysis, it is understood that such bi-modal distributions reveal color non-uniformity of the light guide without coated edge(s) that yields that the chromaticity data shown in diagram 800.

Figure 8C:
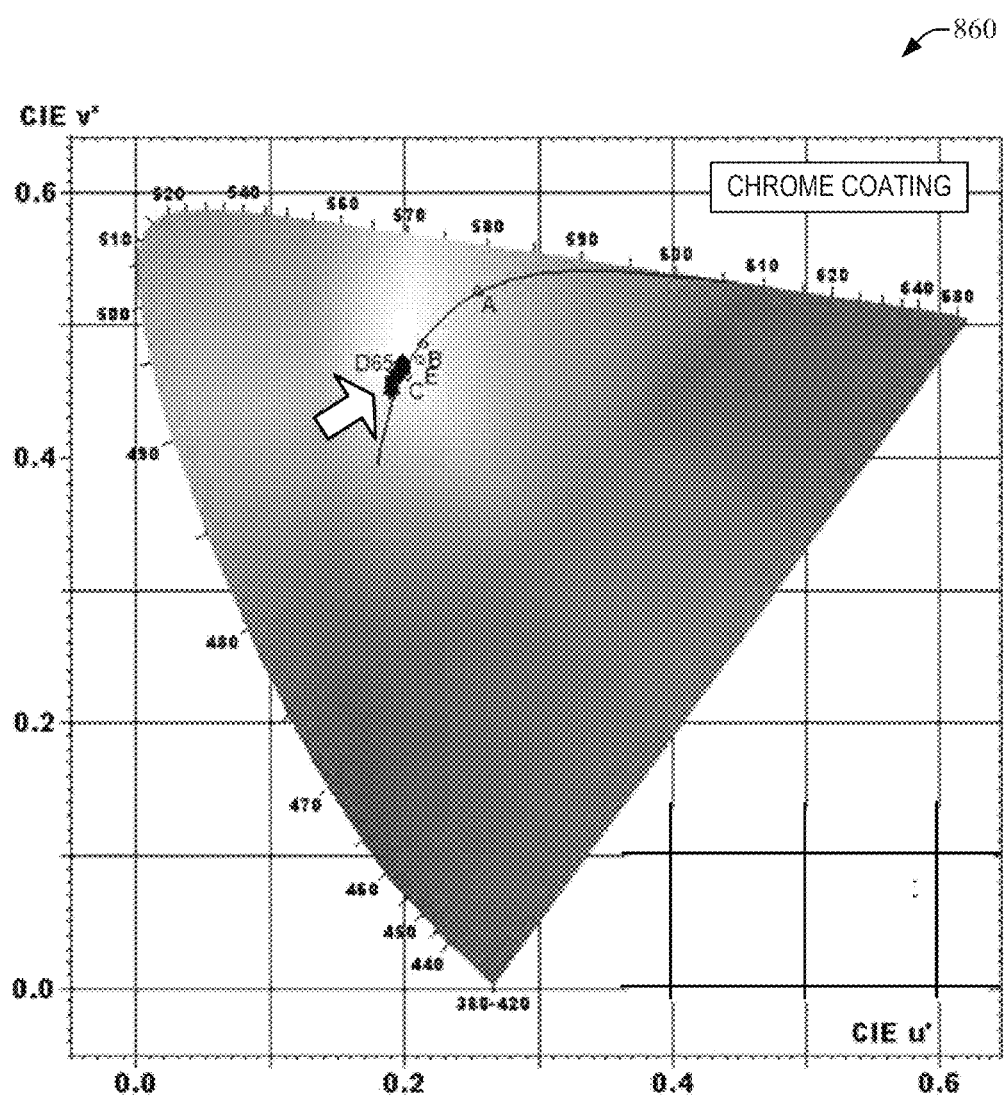
FIG. 8C illustrates an example diagram of a chromaticity map in accordance with one or more aspects of the disclosure.
Figure 8D:
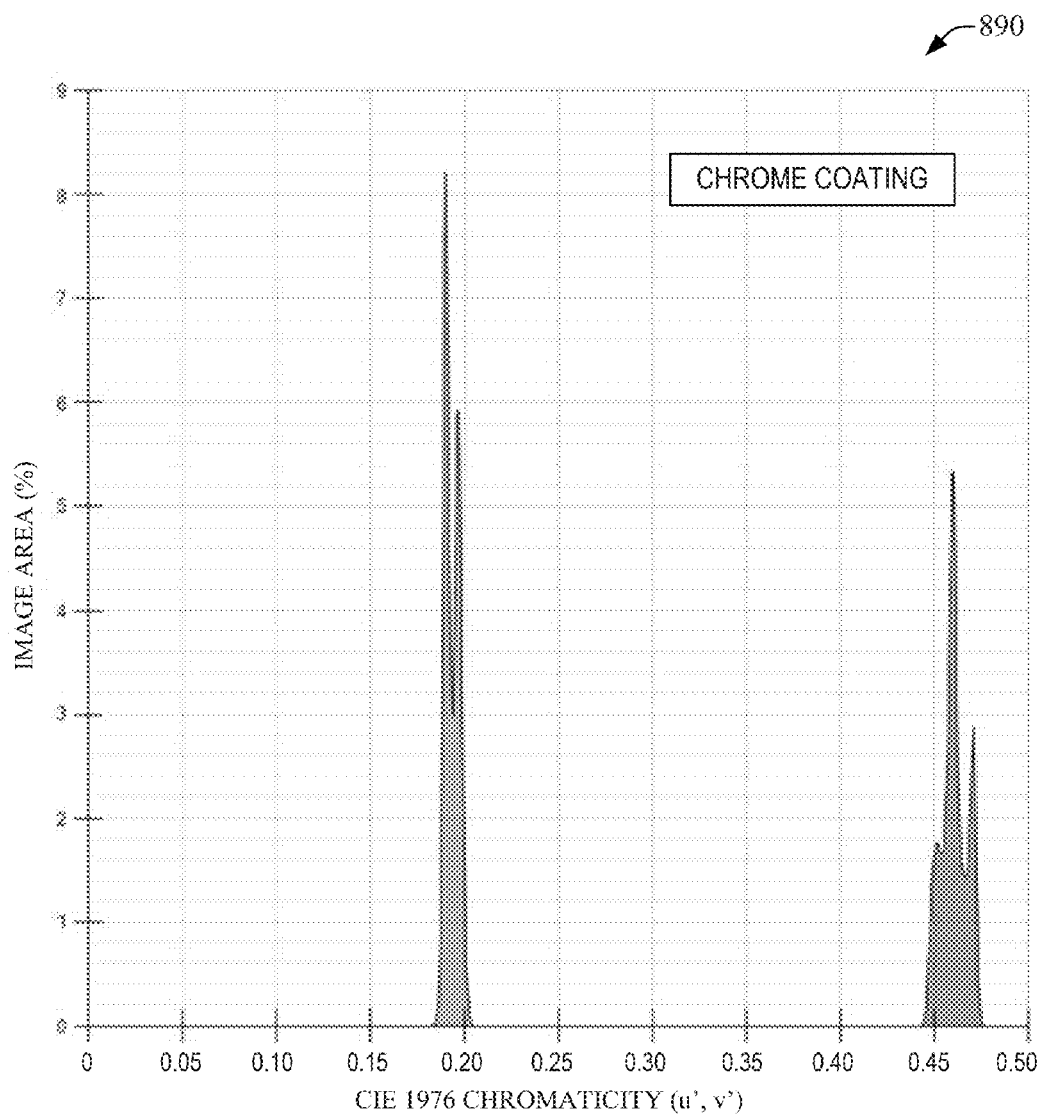
FIG. 8D illustrates an example chart of color coordinate distributions in accordance with one or more aspects of the disclosure.

Further, as described herein, the light guide without coated edge(s) that yields that the chromaticity data shown in diagram 800 can be treated, whereby application of a coating to at least one of the edge surface(s) yields a light guide having one or more coated edges (which may be referred to as coated light guide). The chromaticity analysis described herein can be implemented for such a coated light guide in order to establish the relative chromaticity of illustrative light guides having and lacking coated edge(s). FIG. 8C presents a diagram 860 that conveys values of (u',v') chromaticity coordinates for the coated light guide having edge surface(s) coated with a chrome paint. As described herein, it should be appreciated that the disclosure is not so limited and other coating(s) having other color(s) can be utilized. As in other diagrams disclosed herein, the color coordinate values are represented within the CIE UCS diagram (see, e.g., FIG. 4A). In the diagram 860, values of (u',v') span a portion of the CIE UCS diagram, wherein the portion is represented with densely distributed black dots and emphasized, for clarity, with an open arrow. As gleaned from the diagram 860, values of u' range from about 0.18 to about 0.21, whereas values of v' range from about 0.44 to about 0.48. In addition, example chart 890 in FIG. 8D presents the distribution of values of color coordinates u' and v' presented in the diagram 800. It can be readily appreciated from such a chart that the respective distributions of values of color coordinates u' and v' remain bi-modal in spite of the application or incorporation of the chrome paint. Accordingly, in one aspect, the distribution of values of u' and v' for the light emitted from the light guide without coated edge(s) and the coated light guide having edge(s) coated with chrome paint are at least qualitatively similar. Without intending to be bound by theory, modeling, and/or analysis, it is understood that such invariability of the distribution of (u',v) chromaticity coordinates in spite of the chrome coating reveals a substantially similar color uniformity of the light emanated from both the light guides having and lacking coated edge(s). In another aspect, emission spectroscopy data (e.g., data in FIG. 7) reveals that the relative luminance uniformity of light emitted from the light guide having chrome coatings at respective edge surfaces with respect to light emitted from the light guide without coated edges can increase by about 12% for the same grating design of the light guide 700 as that utilized in the light guide 300.

Figure 9A:
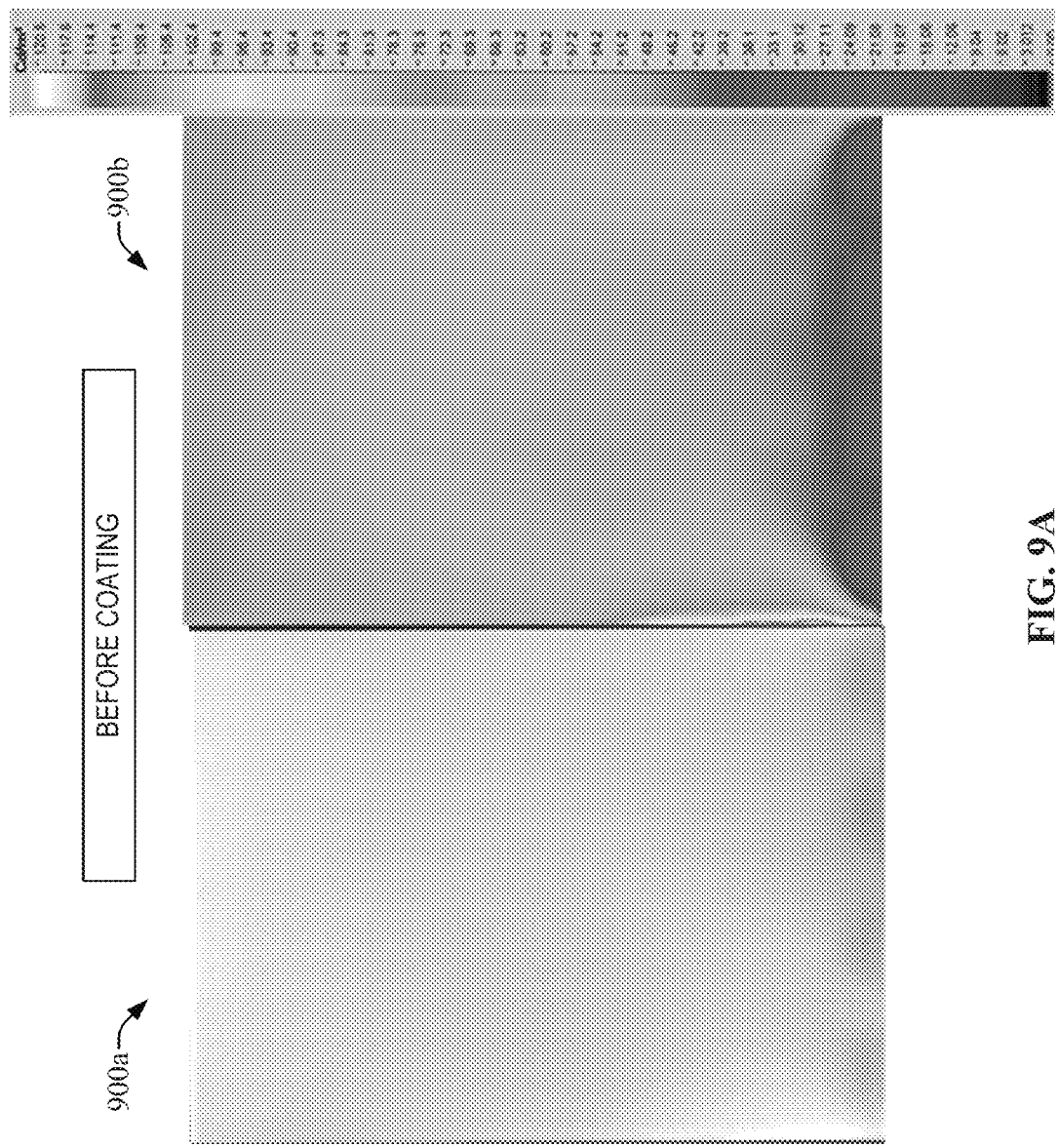
FIGS. 9A-9B illustrates example luminance maps of example front-lit display devices in accordance with one or more aspects of the disclosure.
Figure 9B:
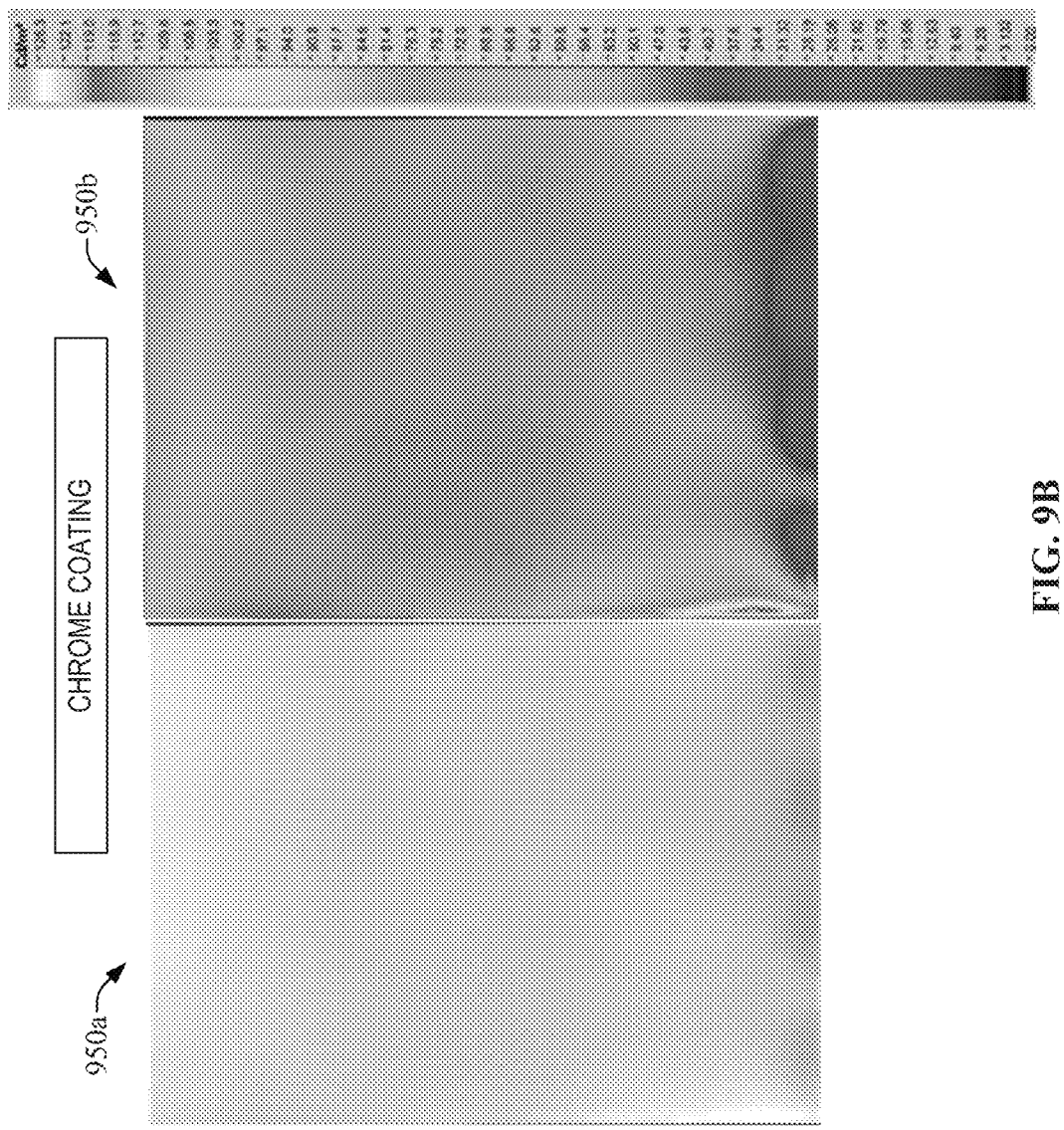

FIG. 9A illustrates example diagrams representative of luminance maps in front-lit displays having non-coated light guides associated with the chromaticity information presented in diagram 800. Diagram 900*a* presents true image luminance data, and diagram 900*b* presents a contour map representation of the data in diagram 900*a*. FIG. 9B also illustrates example diagrams representative of luminance maps in front-lit displays having coated light guides associated with the chromaticity information presented in diagram 860. Diagram 950*a* presents true image luminance data, and diagram 950*b* presents a contour map representation of the data in diagram 950*a*. A comparison of the luminance data reveals at least that the luminance uniformity in a front-lit display device having an example coated light guide having a chrome coating (e.g., an applied layer of chrome paint) is greater than the luminance uniformity in a corresponding front-lit display having a non-coated light guide. Yet, as illustrated in charts 830 and 890, and as described herein, the color uniformity in the front-lit display device having the example coated light guide having the chrome tint coating present similar color uniformity as that in the corresponding front-lit display having the non-coated light guide.

Figure 10:
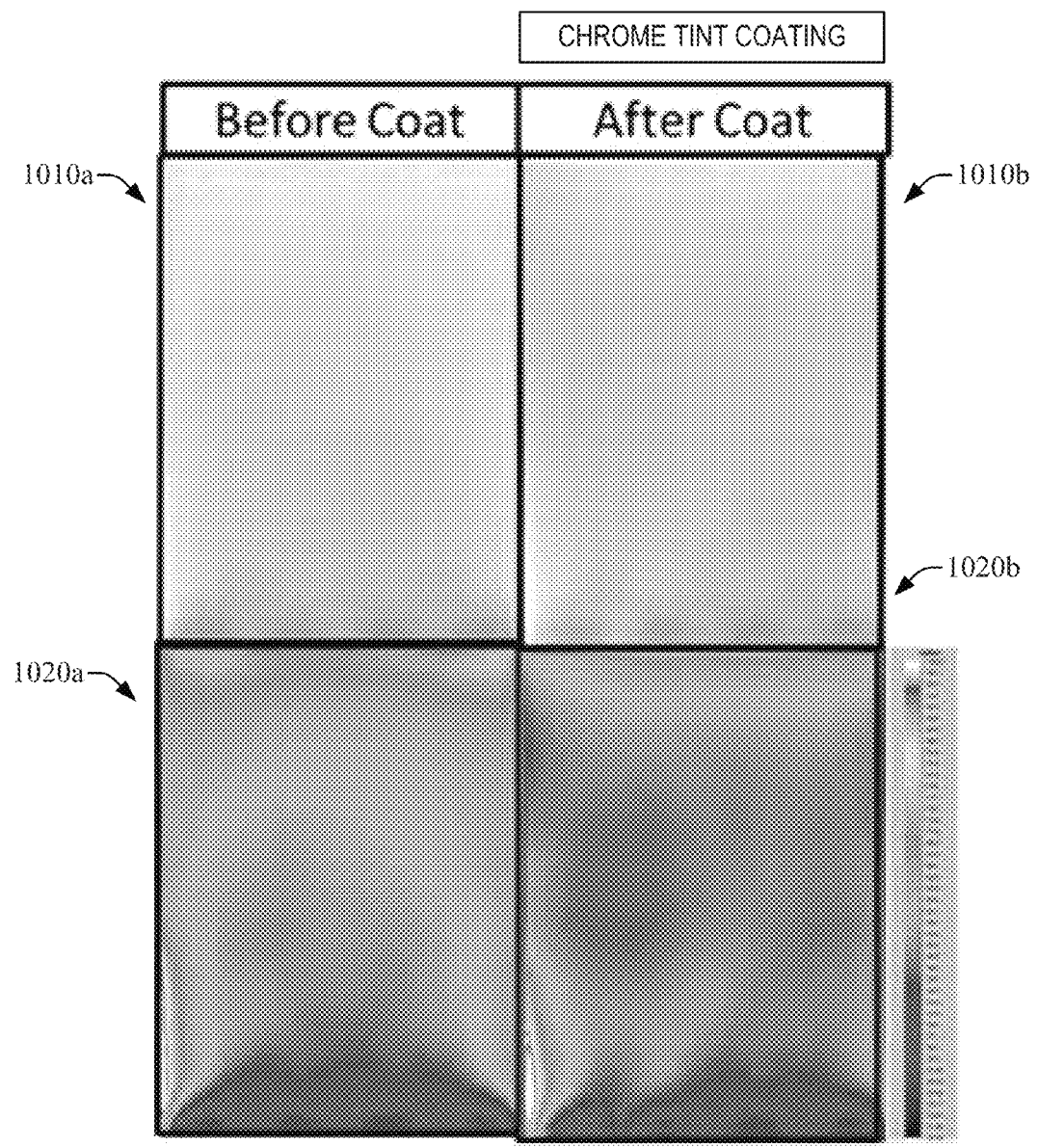
FIG. 10 illustrates example diagrams representative of a luminance map and color map in front-lit displays in accordance with one or more aspects of the disclosure.

FIG. 10 also illustrates example luminance maps in example front-lit displays having non-coated and coated light guides 600. As illustrated in diagrams 1010*a* and 1010*b*, and as described herein, the luminance uniformity in a front-lit display device having an example coated light guide having a chrome coating (e.g., an applied layer of chrome paint) is greater than the luminance uniformity in a corresponding front-lit display having a non-coated light guide. Diagrams 1020*a* and 1020*b* further illustrate the increase luminance uniformity in the front-lit display device having the example coated light guide having the chrome tint coating despite having similar color uniformity as that in the corresponding front-lit display having the non-coated light guide.

Figure 11:
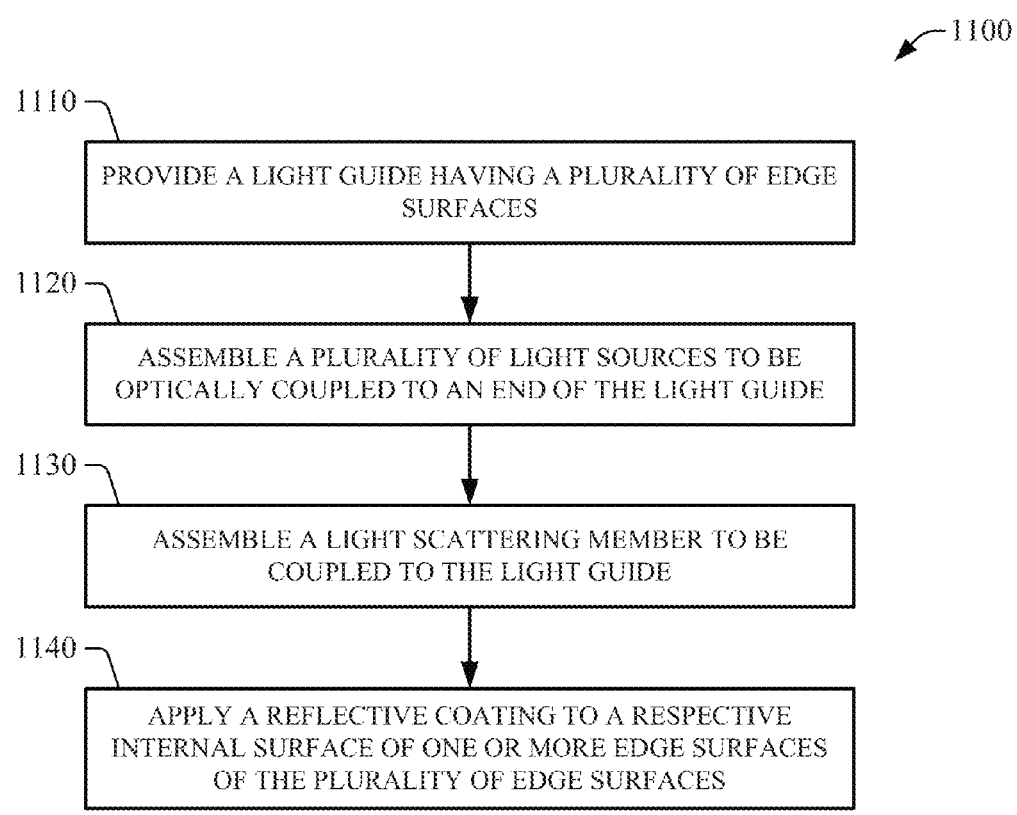
FIGS. 11-12 illustrate example methods in accordance with one or more aspects of the disclosure.
Figure 12:
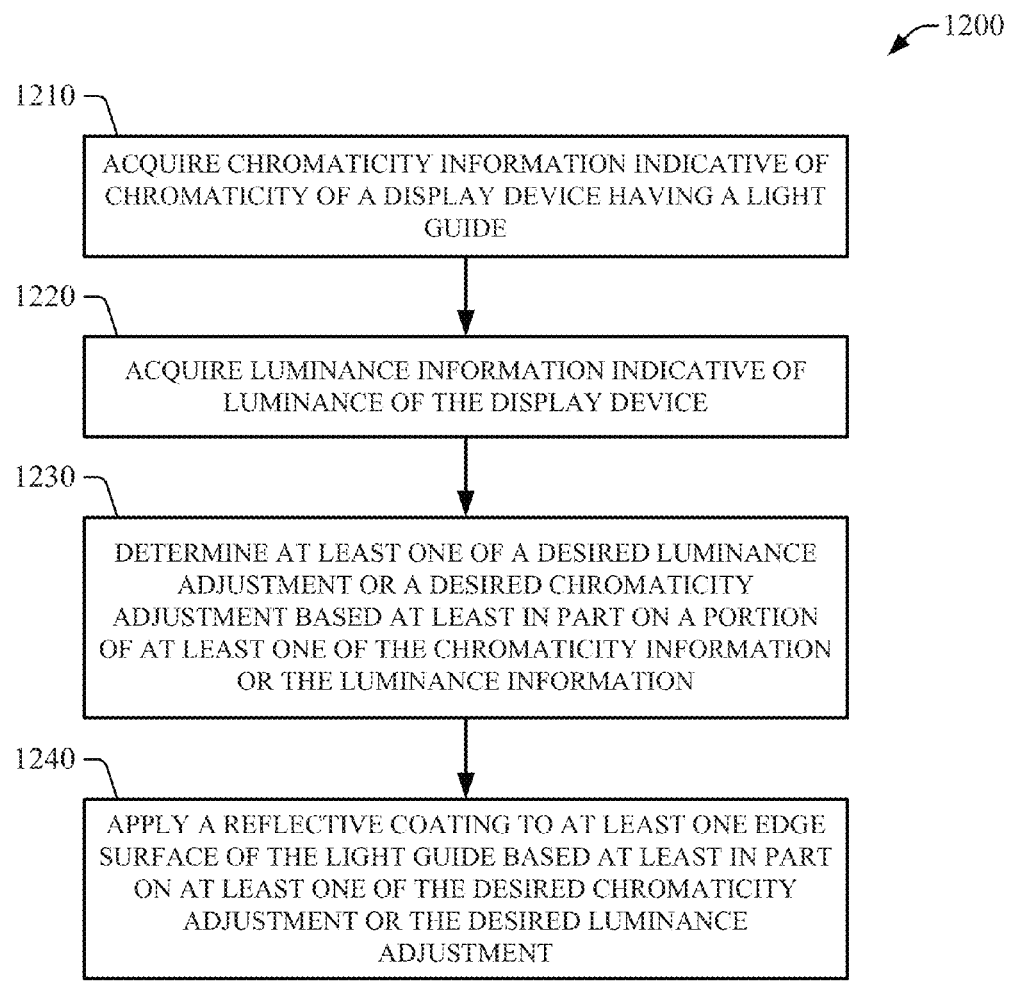

In view of the aspects described herein, example methods that can be implemented in accordance with the disclosure can be better appreciated with reference, for example, to the flowcharts in FIGS. 11-12. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that at least some of the methods of the disclosure can be retained on an article of manufacture, or computer-readable medium, to permit or facilitate transporting and transferring such methods to a computing device (e.g., a desktop computer; a mobile computer, such as a tablet, or a smartphone; a gaming console; a mobile telephone; a blade computer; a programmable logic controller; and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 11 presents a flowchart of an example method 1100 to provide front-lit display devices having coated light guides according to at least certain aspects of the disclosure. At block 1110, a light guide having a plurality of edge surfaces is provided. In one aspect, each edge surface of the plurality of edge surfaces has an internal surface. In certain embodiments, providing the light guide can comprise coupling, mechanically, optically, or the like, to a housing of an electronic assembly comprising a display device. At block 1120, a plurality of light sources is assembled to be optically coupled to the light guide. At block 1130, a light scattering member is assembled to be coupled to an end of the light guide. In one aspect, the light scattering member can have a grating structure configured to transmit light to an end-user of a device comprising the light guide. At block 1140, a reflective coating is applied to a respective internal surface of at least one or more edge surfaces of the plurality of edge surfaces. In one aspect, each of the applied reflective coating(s) can be configured to reflect light emitted by the plurality of light sources (e.g., a set of light emitting diodes). In certain embodiments, applying the reflective coating can comprise one or more of painting the edge surface; applying or coating the respective internal surface with a layer of a solid material; depositing one or more materials onto the edge surface; a combination thereof, or the like. The one or more materials can be deposited, for example, via sputtering or vapor deposition, such as CVD or MOCVD.

FIG. 12 presents a flowchart of another example method 1200 to provide front-lit display devices having coated light guides according to at least certain aspects of the disclosure. At block 1210 chromaticity information indicative of chromaticity of a display device (e.g., a front-lit display) having a light guide is acquired. At block 1220, luminance information (e.g., light emission spectra information) indicative of luminance of the display device is acquired. At block 1230, at least one of a desired luminance adjustment or a desired chromaticity adjustment is determined based at least in part on a portion of at least one of at least one of the chromaticity information of the luminance information. At block 1240, a reflective coating is applied to at least one surface (e.g., an edge surface) of the light guide based at least in part on at least one of the desired chromaticity adjustment and/or the desired luminance adjustment. In one aspect, applying the coating can comprise painting at least a portion of the at least one surface of the light guide with a paint having a specific color.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide a customized layout of indicia, such as a customized keyboard layout. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A display device, comprising:
   a housing, the housing at least partially encloses a light guide having at least three edge surfaces, wherein each edge surface of the at least three edge surfaces has an internal surface;
   a plurality of light emitting diodes optically coupled to the light guide and contained within the housing, each of the plurality of light emitting diodes is positioned at a proximal end of the housing;
   a substantially transparent layer coupled to the housing and contained on a plane substantially normal to the at least three edge surfaces;
   a layer having a plurality of micro-lenses coupled to the light guide, wherein each of the micro-lenses is configured to transmit light from the light emitting diodes to an end-user of the device through the substantially transparent layer; and
   at least three layers of paint respectively applied to the internal surface of each of the at least three edges, each layer of the at least three layers of paint is configured to reflect light emitted by the plurality of light emitting diodes, whereby application of the at least three layers adjusts at least one of luminance of the display device or chromaticity of the display device.

2. The display device of claim 1, wherein each of the at least three layers of paint comprises a layer of paint having a specific color based at least in part on a desired adjustment of the chromaticity of the display device.

3. The display device of claim 1, wherein each of the at least three layers of paint comprises a layer of chrome paint.

4. The display device of claim 1, wherein each of the at least three layers of paint comprises a layer of a glossy blue paint.

5. An electronic assembly, comprising:
   a light guide having a plurality of edge surfaces, wherein each edge surface of the plurality of edge surfaces has an internal surface;
   a plurality of light sources optically coupled to the light guide;
   a substantially transparent layer coupled to the light guide;
   a member coupled to the light guide and having a grating structure, wherein the grating structure is configured to transmit light to an end-user of the electronic assembly through the substantially transparent layer; and
   one or more coatings on one or more respective edge surfaces of the plurality of edge surfaces, at least one of the one or more coatings is configured to reflect light emitted by the plurality of light sources.

6. The electronic assembly of claim 5, wherein at least one coating of the one or more coatings covers at least a portion of at least one internal surface of the one or more respective edge surfaces.

7. The electronic assembly of claim 5, wherein at least one coating of the one or more coatings comprises a layer of glossy colored paint and at least one other coating of the one or more coatings comprises a layer of chrome paint.

8. The electronic assembly of claim 5, wherein at least one coating of the one or more coatings comprises a layer of chrome paint.

9. The electronic assembly of claim 5, wherein at least one coating of the one or more coatings comprises a layer of glossy colored paint.

10. The electronic assembly of claim 5, wherein at least one coating of the one or more coatings comprises a reflective solid thin-film.

11. The electronic assembly of claim 5, wherein each coating of the one or more coatings comprises a layer of chrome paint.

12. The electronic assembly of claim 5, wherein each coating of the one or more coatings comprises a layer of glossy colored paint.

13. The electronic assembly of claim 11, wherein the layer of glossy colored paint comprises an oil-based blue paint.

14. A method, comprising:
   providing a light guide having a plurality of edge surfaces, wherein each edge surface of the plurality of edge surfaces has an internal surface;
   assembling a plurality of light sources to be optically coupled to the light guide;
   assembling a light scattering member to be coupled to the light guide, the light scattering member having a grating structure configured to transmit light to an end-user of a device comprising the light guide; and
   applying a reflective coating to a respective internal surface of one or more edge surfaces of the plurality of edge surfaces, thereby adjusting at least one of luminance of a display device having the light guide or chromaticity of the display device,
   whereby each reflective coating is configured to reflect light emitted by the plurality of light sources.

15. The method of claim 14, wherein the applying comprises applying at least one layer of a glossy colored paint and at least one layer of a chrome paint.

16. The method of claim 14, wherein the applying comprises applying a layer of glossy colored paint.

17. The method of claim 14, wherein applying the layer of glossy colored paint comprises applying an amount of an oil-based blue paint.

18. The method of claim 14, wherein the applying comprises applying a layer of chrome paint.

19. The method of claim 14, wherein the applying comprises applying a reflective solid thin-film.

20. A method, comprising:
   acquiring chromaticity information indicative of chromaticity of a display device having a light guide;
   acquiring luminance information indicative of luminance of the display device;
   determining at least one of a desired luminance adjustment or a desired chromaticity adjustment based at least in part on a portion of at least one of the chromaticity information or the luminance information; and
   applying a coating to at least one edge surface of the light guide based at least in part on at least one of the desired chromaticity adjustment or the desired luminance adjustment.

21. The method of claim 20, wherein the applying comprises painting at least a portion of the at least one surface of the light guide with a paint having a specific color.

* * * * *